(12) United States Patent
Seitz et al.

(10) Patent No.: US 7,395,027 B2
(45) Date of Patent: Jul. 1, 2008

(54) COMPUTER-AIDED EDUCATION SYSTEMS AND METHODS

(76) Inventors: Thomas R. Seitz, 300 Walnut Bottom Rd., Carlisle, PA (US) 17013; Chris W. Anderson, 689 Wortham Dr., Mundelein, IL (US) 60060

( * ) Notice: Subject to any disclaimer, the term of this patent is extended or adjusted under 35 U.S.C. 154(b) by 186 days.

(21) Appl. No.: 10/640,385

(22) Filed: Aug. 14, 2003

(65) Prior Publication Data
US 2004/0133532 A1 Jul. 8, 2004

Related U.S. Application Data

(60) Provisional application No. 60/403,363, filed on Aug. 15, 2002.

(51) Int. Cl.
*G09B 3/00* (2006.01)
(52) U.S. Cl. ........................ 434/350; 434/118
(58) Field of Classification Search ................. 434/350, 434/118, 362, 322, 323
See application file for complete search history.

(56) References Cited

U.S. PATENT DOCUMENTS

| | | | |
|---|---|---|---|
| 5,727,950 A * | 3/1998 | Cook et al. | 434/350 |
| 6,201,948 B1 | 3/2001 | Cook et al. | |
| 6,427,063 B1 | 7/2002 | Cook et al. | |
| 6,535,861 B1 | 3/2003 | O'Connor et al. | |
| 6,542,880 B2 | 4/2003 | Rosenfeld et al. | |
| 6,606,479 B2 | 8/2003 | Cook et al. | |
| 6,611,822 B1 | 8/2003 | Beams et al. | |
| RE38,432 E | 2/2004 | Fai et al. | |
| 6,801,751 B1 * | 10/2004 | Wood et al. | 434/362 |
| 2004/0014017 A1 * | 1/2004 | Lo | 434/322 |

FOREIGN PATENT DOCUMENTS

WO    WO 2004/013770 A2    2/2004

OTHER PUBLICATIONS

First Examination Report from the Government of India Patent Office dated May 5, 2006 (3 pages).
PCT Written Opinion dated May 17, 2004 (4 pages).
International Search Report from the International Searching Authority dated Mar. 19, 2004 (5 pages).

* cited by examiner

*Primary Examiner*—Robert E. Pezzuto
*Assistant Examiner*—Alex F. R. P. Rada
(74) *Attorney, Agent, or Firm*—Finnegan, Henderson, Farabow, Garrett & Dunner, LLP

(57) ABSTRACT

Computer-aided education systems and methods provide a learner with a pedagogically appropriate interaction, including determining learner information. A state for the interaction is determined based on the determined learner information. A concept pattern is created based on the determined state. The appropriate interaction is then accessed based on the concept pattern and the determined state.

21 Claims, 8 Drawing Sheets

COMPUTER-AIDED EDUCATION SYSTEMS AND METHODS

RELATED APPLICATIONS

This application claims priority to U.S. Provisional Patent Application No. 60/403,363, filed Aug. 15, 2002, the contents of which are hereby incorporated by reference into this application as if set forth herein in full.

TECHNICAL FIELD

The present invention relates generally to computer-aided education systems and methods and more particularly, to intelligent computer-aided education systems having pedagogical capabilities.

BACKGROUND

As computer technology becomes more ubiquitous, computer-aided education or instructional (CAI) products are becoming increasingly prevalent. CAI products are currently available for nearly every level of learner, from pre-school and elementary aged children to people taking college courses or specialized courses focusing on a particular topic. These software products may be used on a personal computer or on a computer network. CAI products are also available via the Internet. Some CAI products are directed towards an independent learner, while others are intended for use in a classroom setting, for example, to supplement or enhance the learning provided by an instructor. Despite the wide variety of products available, most CAI programs have similar disadvantages.

Most of the currently available CAI products may be described as "page-turners." This type of software presents the learner with graphical representations of text and pictures. With "page-turner" type products, the learner's experience is much like paging through a book in electronic form in that the presentation is static. For example, regardless of the learner's behavior, the learner will encounter a first page or screen, then a second page or screen, and so on. There is little or no interaction between the learner and the CAI product, nor does the product have pedagogical capabilities. The learner must extract information for himself from the presentation.

Another category of CAI software includes the video-game type of product. The video-game type products often disguise drill and practice problems in the form of a game that, for example, may let a learner advance their score or level by correctly answering questions. The questions presented frequently have nothing to do with the game's theme or scenario. For example, the learner may progress through a forest towards a prize by answering multiplication table questions. If the learner repeatedly answers incorrectly, the software may provide a static tutorial. Video-game type CAI products do represent an improvement over "page-turner" type products, in that the learner remains engaged via an interactive experience. Further, video-game software also may be able to provide some sort of report or feedback on the learner based on a particular skill set, such as multiplication tables. However, these products are still deficient in pedagogical capabilities.

Very few CAI products exhibit any intelligence or pedagogical capability. Of those systems that do exhibit intelligence, most are task-oriented, in that the products execute a sequence of tasks in a pre-determined sequence, regardless of learner input. Such systems may simulate one-on-one tutoring and may include an extensive expert model. The system may also compare learner performance to the expert model and deliver tutoring or coaching intervention whenever it determines that a learner has deviated from the expert model. Because the system includes some intelligent aspects, it may be used to train a learner to work through a complex, multi-step task, such as medical or technical procedures or solving advanced mathematical or scientific problems.

A disadvantage of these types of task-oriented CAI products, however, is that adherence to the expert model is required, whereas human teachers have the ability to approach the problem with learners in a flexible manner. Further, the expert model also requires adherence to a particular procedure for solving the complex problems. These types of products are unable to account for learner input or to alter the procedure for solving a problem based on the learner's problem solving approach. These aspects render these task-oriented CAI systems unsuitable for constructionist learning environments, where problem-solving skills are cultivated and learners are encouraged to find their own paths to solving problems.

Accordingly, it is desirable to provide an intelligent CAI system and method that has pedagogical and diagnostic capabilities. Further, it is desirable for the intelligent CAI system to focus on a learners' mastery of concepts rather than requiring strict adherence to procedure, thus permitting a flexible approach to learning. Further still, it is desirable to provide a CAI system that can be adjusted to focus on concepts based on a particular syllabus and/or set of priorities.

SUMMARY

Consistent with the present invention, there is provided a method for presenting a learner with a pedagogically appropriate interaction, including determining learner information; determining a state for the interaction based on the determined learner information; creating a concept pattern based on the determined state; and accessing the appropriate interaction based on the concept pattern and the determined state.

Further, there is provided a system for presenting a learner with a pedagogically appropriate interaction including an output device for displaying the interaction to the learner; an input device to allow the learner to interact with the system; and a computer, wherein the computer includes a processor and a memory, the memory including an intelligent computer-aided instructional (CAI) system and wherein the intelligent CAI system further includes: a session player for presenting the interaction to the output device; a movie data component for storing media files to be used by the session player; an agent engine for determining the appropriate interaction to be played by the session player and for determining movie data in the movie data component to be accessed by the session player; and a concept matrix used by the agent engine to determine the appropriate interaction.

Additional features and advantages of the invention will be set forth in part in the description which follows, and in part will be obvious from the description or may be learned by practice of the invention. The features and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate an embodiment of the invention and, together with the description, serve to explain the principles of the invention.

DESCRIPTION OF THE EMBODIMENTS

Reference will now be made in detail to specific exemplary embodiments of the invention. Wherever possible, the same reference numbers will be used throughout the drawings and written description to refer to the same or like parts.

Overview

Systems and methods consistent with the principles of the present invention provide one or more of the following advantages over conventional CAI systems: an instructional model based on emulating pedagogical skills, with a particular focus on tailoring the program to each particular learner; analysis of a learner's ability to solve problems, master concepts, and apply his or her understanding of the concept to problem solving; an educational program that is appropriate for both instructive and constructionist settings; and improved management of learner impasses. These attributes (e.g., pedagogical model, management of impasses, and high degree of individualization) provide for a highly interactive learning experience.

Intelligent CAI System

Figure 1:
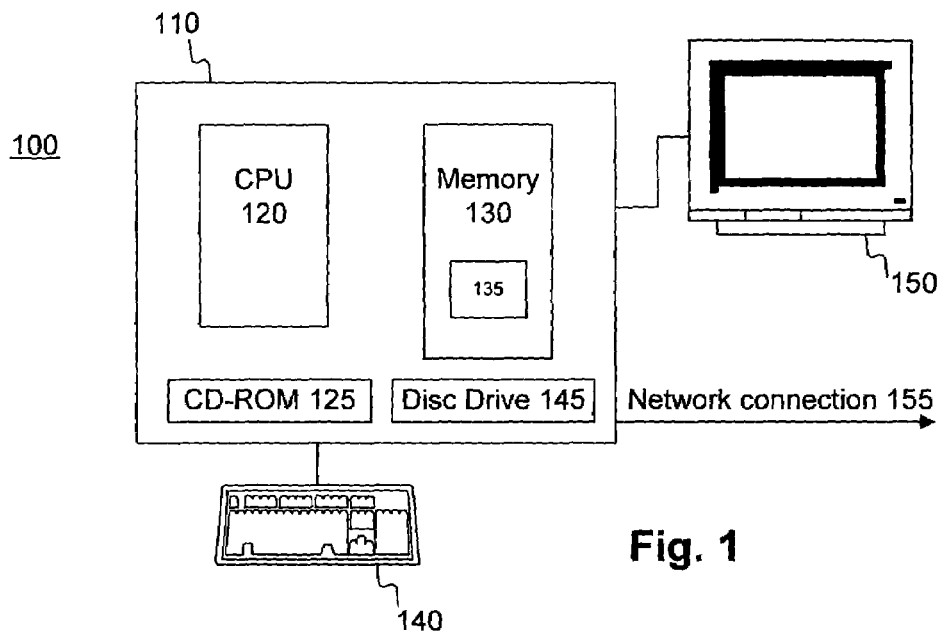
FIG. 1 is an exemplary block diagram of a system for providing an intelligent CAI product consistent with the principles of the present invention.

By way of a non-limiting example, FIG. 1 illustrates an exemplary system environment 100 for implementing the features and principles consistent with the present invention. System environment 100 includes a personal computer 110. Personal computer 110 includes, for example, desktop computers, laptop computers, handheld devices, and Internet terminals. Personal computer 110 includes a CPU 120, a CD-ROM 125, a memory 130, a disc drive 145, an input device 140, and an output device 150. Personal computer 110 also includes a network connection 155 for accessing the Internet and/or external servers. Memory 130 may include an intelligent CAI system 135 that, when accessed by CPU 120, provides a pedagogically capable educational experience for a learner. Intelligent CAI system 135 may also be provided on a computer-readable medium, such as a disk, CD-ROM, or other storage medium readable by personal computer 110 and processed by CPU 120. The system may also be downloaded from, for example, the Internet, by way of network connection 155. CAI system 135 is described in greater detail below. Input device 140 may include a keyboard, mouse, or other data entering devices. Output device 150 may include a monitor, screen, or other display device. A learner is presented with an interactive tutorial via output device 150 and solves problems and/or answers questions using input device 140.

Figure 2:
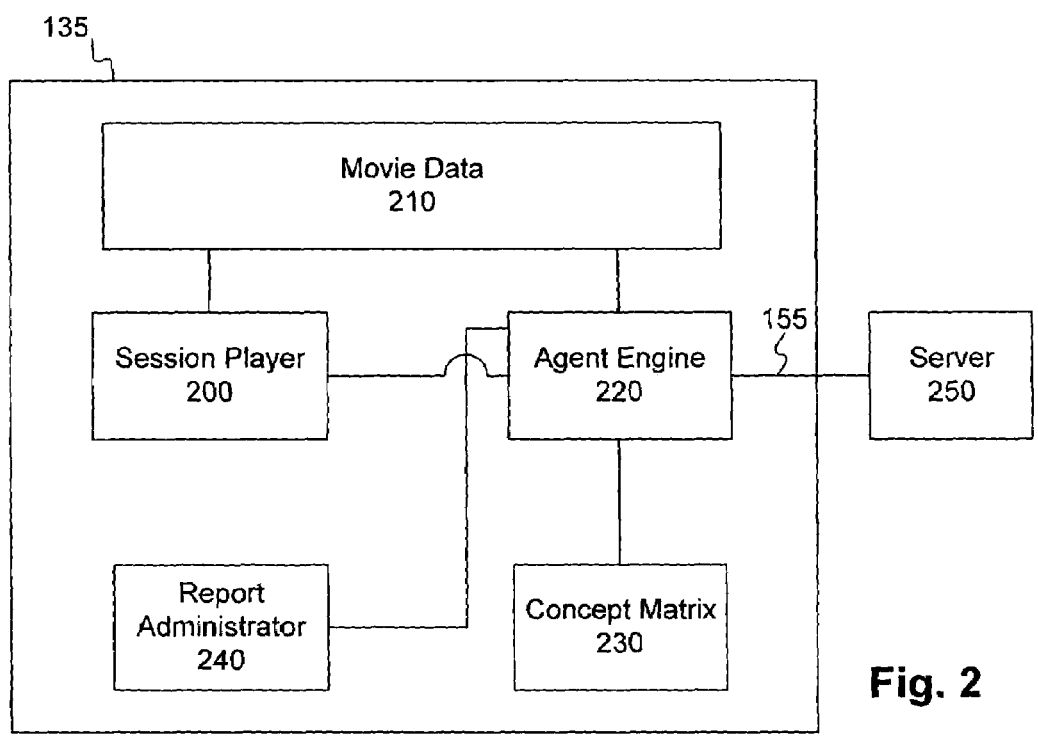
FIG. 2 is an exemplary block diagram of an intelligent CAI system consistent with the principles of the present invention.

FIG. 2 is a block diagram illustrating exemplary components of intelligent CAI system 135. Intelligent CAI system 135 may include a session player 200, movie data 210, an agent engine 220, a concept matrix 230, and a report administrator 240. Additionally, agent engine 220 may communicate with an external server 250 via network connection 155. Network connection 155 may include access to the World Wide Web and/or the Internet. In general, session player 200 accesses tutorial sequences and problems from movie data 210 and displays the sequences and questions to the learner. Agent engine 220 determines which tutorial sequences and problems from movie data 210 are appropriate for the learner, based on concept matrix 230 and the learner's input. Report administrator 240 may provide reports of a learner's progress, as well as analysis of the learner's mastery of a concept, to an instructor or other supervisor. CAI system 135 may be implemented using Standard Query Language (SQL), by using relational databases to store information associated with agent engine 220 and/or concept matrix 230. Relational databases provide the advantage of increasing performance of data searching as well as allowing easy storage of large amounts of data; however, other forms of data storage may also be used. Interfaces between session player 200, movie data 210, agent engine 220, concept matrix 230, and report administrator 240 may be programmed using the JAVA™ programming language, although other programming languages are also suitable.

Agent engine 220 may use historic information and/or identification information about a learner to determine a best manner of proceeding in the learner's educational progression. In particular, agent engine 220 accesses concept matrix 230 to determine relationships between concepts and levels of tutorial sequences and questions within a particular concept in order to best select an appropriate sequence or question, and for evaluating a response to a sequence or question in order to analyze historic information about a learner. Agent engine 220 works in a real-time environment, seeking the next sequence or question while the learner is interacting with the current sequence or question. As such, agent engine 220 may need to sort through concept data and historic information quickly, so that the learner is not left waiting for the next sequence or question. In order to achieve real-time interaction, agent engine 220 may store a default "next sequence/question" or may choose the best sequence or question based on the allotted time. Agent engine 220 also may store data later used by report administrator 240. For example, the stored data may include subject matter and concepts presented to the learner, as well as how well the learner answered the associated questions. Stored data may also provide an overview about the learner's ability compared to an average ability stored, for example, in concept matrix 230.

Figure 3:
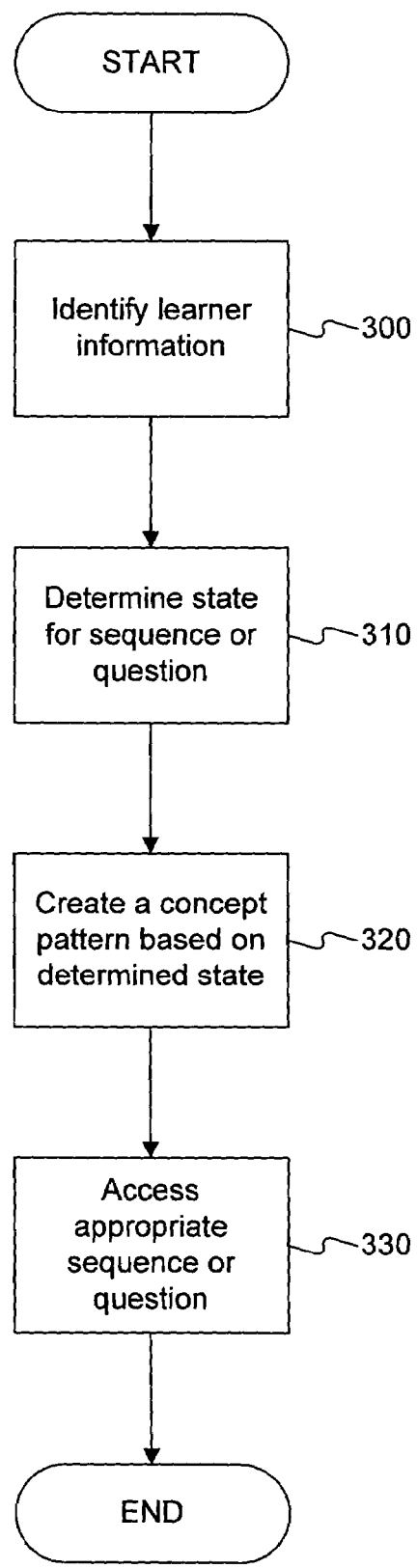
FIG. 3 is an exemplary flow chart of a method, consistent with the principles of the present invention, for providing pedagogically appropriate lessons or questions.

FIG. 3 illustrates an exemplary flow diagram of an agent engine for determining pedagogically appropriate interactions for the learner, that is, the appropriate tutorial sequences and questions, consistent with the present invention. Agent engine 220 first identifies learner information (Step 300). Learner information may include demographic and grade level data as well as historic information about the learner. Historic information may include a session log associated with a learner, which agent engine 220 may analyze using concept matrix 230. The learner may log into the intelligent CAI system 135, for example, by providing a user name or identification and a password. The first time a learner uses the system a user name or identification may be created. As the learner utilizes the system, the user name or identification may be used to track and store the historical data associated with the learner, for example, in a session log.

Agent engine 220 next determines the appropriate state for the next sequence or question to provide to the learner (Step 310). For example, the possible states may include the so-called "challenging," "reinforcing," or "reviewing" states. Agent engine 220 considers historical data about the learner to determine the appropriate state. For example, agent engine 220 may use a session log of the learner's previous lessons to determine correct answers to questions and/or positive responses to lessons. If agent engine 220 determines a history of correctly answered questions, the "challenging" mode is invoked. If agent engine 220 determines a negative trend, agent engine 220 determines a "reviewing" state is appropriate. If no trend is evident, the "reinforcing" state is invoked. In one embodiment, if no historic data about a particular learner is available, agent engine 220 switches between the "challenging" and "reviewing" modes until an appropriate state is determined.

In the "challenging" mode, agent engine 220 may search for tutorial sequences or questions that are above the learner's demonstrated level of ability. This state permits agent engine 220 to push and test the learner's knowledge and allow the learner to reach a higher level of learning. In the "reinforcing" state, agent engine 220 searches for tutorial sequences or questions that relate to information at the same level as the learner's demonstrated level of ability. For example, questions in the "reinforcing" state should not be easy but would require the learner to think about the concept prior to answering. Although the "reinforcing" mode searches for questions at the same level, agent engine 220 searches for questions not previously seen by the learner. In the "reviewing" state, agent engine 220 searches for sequences and types of questions that the learner has already viewed or questions based on underpinning concepts. When the "reviewing" state is invoked for a long period of time, the questions and tutorial sequences presented will get progressively easier until the learner exhibits mastery of the underpinning concept.

Agent engine 220 next creates a concept pattern of information to find a best tutorial sequence or question based on the determined state (Step 320). Agent engine 220 may create a list of concepts, wherein each concept has an associated level value. The first list of concepts created may include a link to the last question or tutorial sequence accessed by the learner. If the system is in the so-called "reinforcing" state, agent engine 220 may search for a tutorial sequence or question like the current one or a closely related tutorial sequence or question based on the concept pattern of the current question. In the so-called "challenging" state, agent engine 220 searches for tutorial sequences or questions within the concept but at higher test levels and learn levels. If the learner has reached the highest level of tutorial sequences or questions for a particular concept, agent engine 220 seeks the next concept higher in a line of concepts, based on "concept_link" tables, discussed below. Similarly, in the so-called "reviewing" state, agent engine 220 searches for lower level tutorial sequences or questions for a particular concept, seeking simpler concepts when the lowest level is reached.

Finally, agent engine 220 accesses an appropriate tutorial sequence or question based on the determined state and the concept pattern (Step 330). Agent engine 220 identifies concepts that are linked at the appropriate level or row of the "session_detail" table, discussed below. Each row is cross-checked and rated by test level and learn level against the highest level of sequence or question identified by agent engine 220. If the searched session is rated higher than the current session, the searched session replaces the current session. In one embodiment, the search continues until a response is required in order to display the question or tutorial sequence to the learner or until all "session_detail" records in the "session_detail" table have been searched. In another embodiment, agent engine 220 also creates a concept pattern for the one or more states ("challenging," "reinforcing," or "reviewing") not determined in step 310 so that agent engine 220 may react more quickly to a determined change in state.

The basic elements of concept matrix 230 are discrete concepts that serve as building blocks of knowledge and mastery of a particular subject matter. Additionally, concept matrix 230 may include data entered into the system by an instructor or supervisor that may align the system to a particular set of training objectives or to a syllabus. Concept matrix 230 also includes a set of information that defines relationships between concepts, relationships between tutorial sequences and questions and concepts, relationships between concepts and movie data, and relationships between concepts and grade levels. Using these defined relationships, agent engine 220 can evaluate student responses and search for the next appropriate sequence or question. Agent engine 220 may also identify relationships between concepts and levels of mastery thereof by a learner. Finally, concept matrix 230 also identifies priorities and concepts for use in preparing reports and diagnostic analyses.

Figure 4:
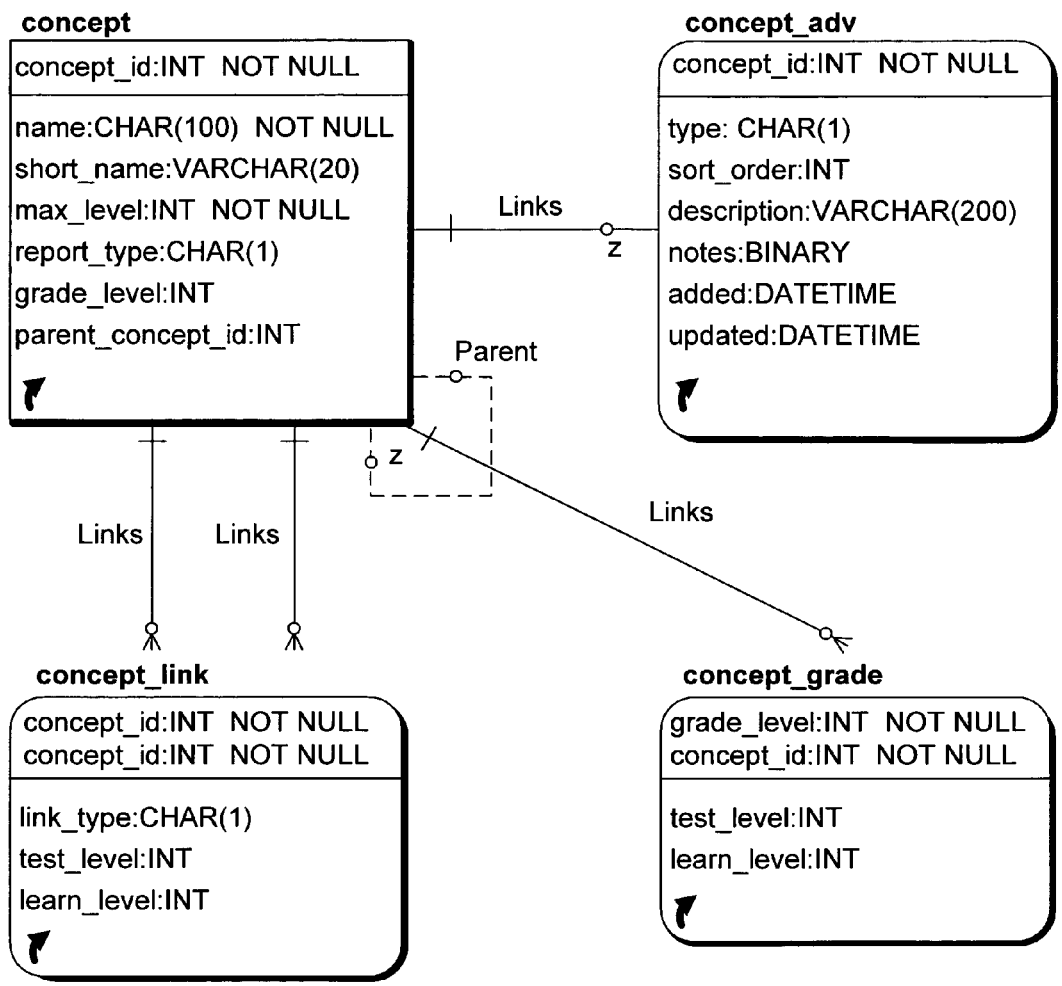
FIG. 4 is an exemplary entity relationship diagram of concept tables associated with the concept matrix of the present invention.

The data in concept matrix 230 may be changed to meet the needs of an instructor or supervisor, as the data or records may be stored in table structures and relationships as shown by the Entity Relationship ("ER") diagram of FIG. 4. A concept record is a building block of learnable subject matter that may be defined and tracked as an individual unit. Each concept record may have a unique number, such as a "concept_id," that is used to create indexed links between other concept tables. Records in a concept table can have parents and/or children linked to them. The child/parent relationship may be defined, for example, using a "parent_concept_id" identifier. This system of concepts creates a hierarchy that makes it easier to view how concepts relate to other concepts at a subject level. An exemplary concept table is given below:

| concept_id | name | short_name | ... | parent_concept |
|---|---|---|---|---|
| 1 | Math 101 | Math | | <NULL> |
| 2 | Simple addition | Addition | | 1 |
| 3 | Simple subtraction | Subtraction | | 1 |
| 4 | Division | Division | | 1 |
| 5 | Simple division | S Division | | 4 |

In the above example, concept 1 is the parent to concepts 2, 3, and 4. Concept 4 is the parent to concept 5. The "name" column in the concept table may be used to store the full name of the concept. The "short_name" column name is used to store a value that may be used as a label on reports and graphs to allow them to look and format better.

The concept table may also include a "max_level" column, which includes a variable representing the size or degree to which a concept can be tested or mastered. For example, a "max_level" of 1 may mean that there is only one level for the concept, whereas a "max_level" of 10 may indicate 10 different levels to which the concept can be mastered, with 1 being the lowest level of mastery and 10 being the highest level of mastery. Agent engine 220 uses this variable to determine when a student has mastered a concept and should go on to the next concept, linked to the current concept.

Other concept table columns or additional tables may store, for example "grade_level," "report_type," "concept_adv," "concep_link," and/or "concept_grade." "Grade_level" represents the defined value of when a learner should start learning and being tested on a particular concept. The "grade_level" variable provides an entry point on a school grading system to indicate when a concept should be available to a learner. The "report_type" variable is used to determine what report should be displayed in order to best report a concept, providing report administrator 240 a means to find the right concepts for a report. "Concept_adv" provides advance information for the concept, and helps explain and track more detail about a concept. "Concept_adv" may be implemented as a separate table as it is used by instructors and educators rather than agent engine 220.

"Concept_link" defines the relationships between concepts that are currently being tested with higher or lower valued concepts. Each concept may thus build on other concepts, which can be linked together. The "concept_id_to" and "concept_id_from" provides a bridge between two concept records, indicating the next concept for exploration and the previously explored concept. "Concept_link" may also store the levels a learner must attain in order to bridge to the next concept. "Concept_link" may store these required levels using the columns storing "test_level"

and "learn_level" information. A "test_level" may indicate that the student has successfully answered questions at an acceptable level of proficiency as defined by session tables. Session tables are discussed more fully in connection with FIG. 5 below.

A "learn_level" may indicate that the student has previously been presented lessons and other tutorial materials at a level defined by session tables. Agent engine 220 may allow for flexibility in that in order for a learner to advance to a new concept, the learner is not automatically required to learn all of the subject matter of current concepts. After a sufficient level of proficiency is reached, for example, the learner may move on to more advanced topics.

The "concept_grade" table may link concepts to a particular grade level by estimating the level at which a learner should be. In addition, the "concept_grade" table may also define the "test_level" and "learn_level." The "concept_grade" table thus establishes a degree of accuracy that the student should have reached. Also, "concept_grade" provides an indication to agent engine 220 of the level of difficulty that the student should be further tested on to master concepts yet to be mastered.

Instructors and supervisors can align concept matrix 230 to their own syllabus by altering the "concept_to" or "concept_from" variables, thereby shaping the hierarchy of concepts through which a learner must progress. Instructors can also alter the level value required to show proficiency in a subject, as well as alter the "grade_level" value, causing agent engine 220 to focus on particular concepts for a particular age group or grade level.

Each of the discrete concepts, or building blocks, corresponds to tutorial sequences for that concept, as well as questions or problems associated with the concept. In one embodiment, there are also guidelines that may be used by agent engine 220 to generate new questions for a concept. The group of questions may represent a range of problems suited to different learning types, such as equation solving or word problems. Upon completion of each group of questions, the learner should have mastered that concept sufficiently to apply that understanding to solving other problems and mastering other more advanced concepts. These tutorial sequences and associated questions or problems may be considered a session.

Figure 5:
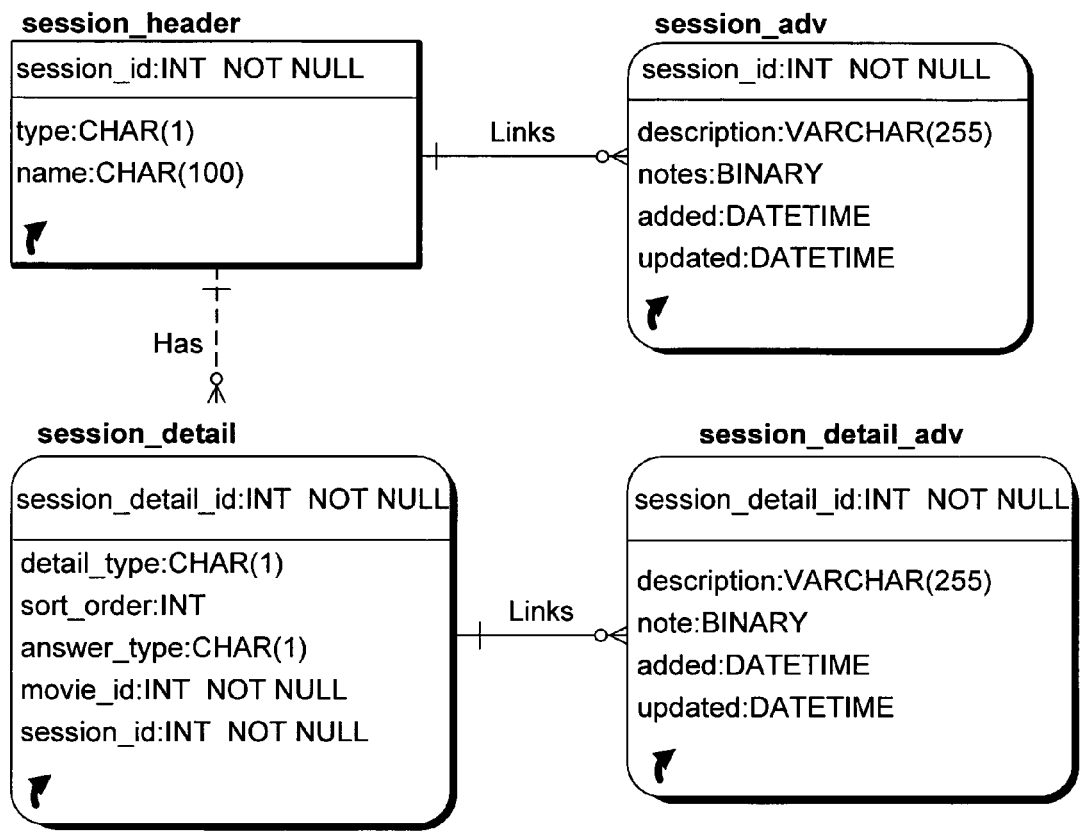
FIG. 5 is an exemplary Entity Relationship diagram of session tables consistent with the present invention.
Figure 6:
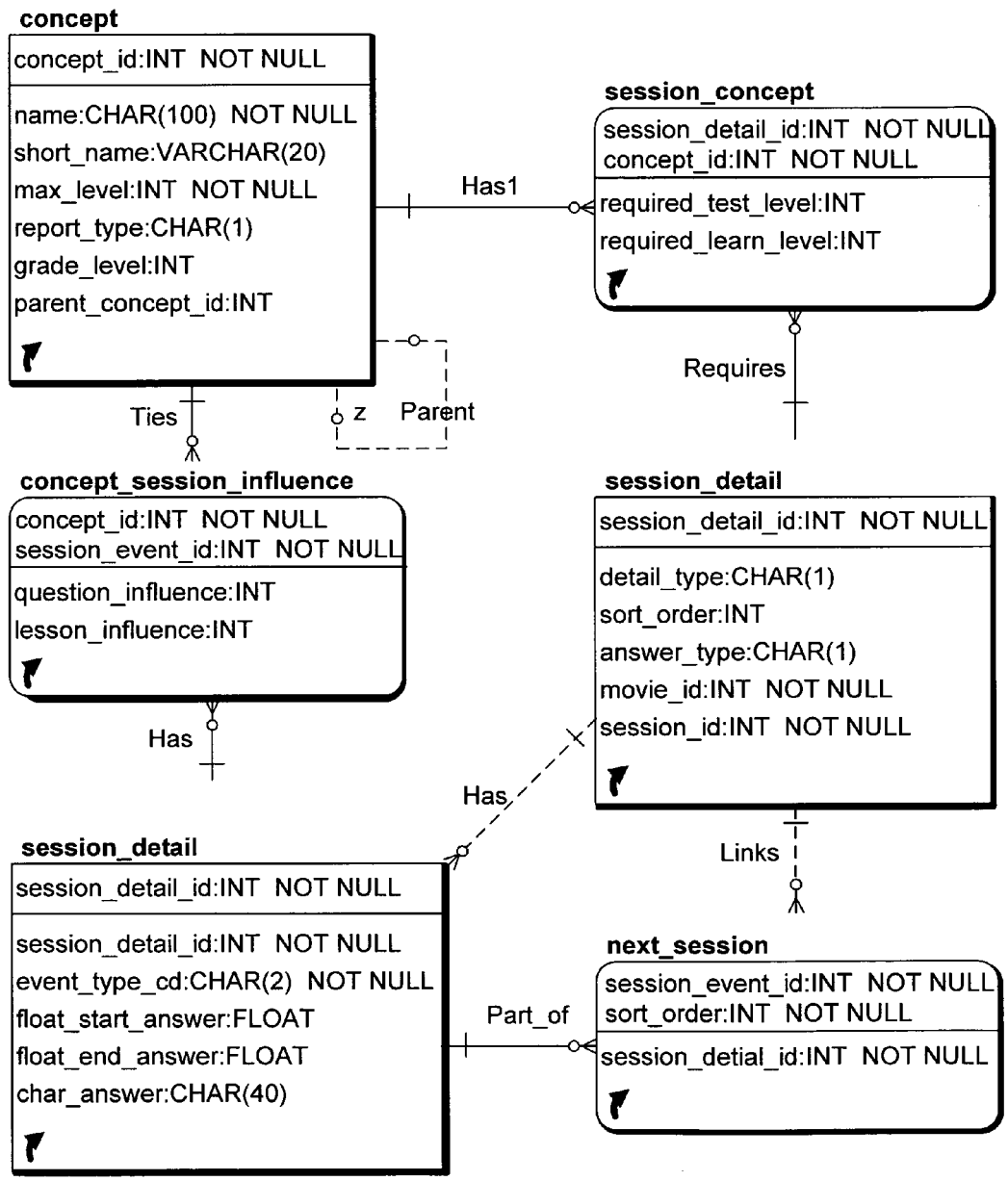
FIG. 6 is an exemplary Entity Relationship diagram illustrating the relationship between concepts and sessions according to the present invention.

Session tables are used to store data about what tutorial sequences and questions agent engine 220 will present to the learner via session player 200. An overview ER diagram for basic session tables is illustrated in FIG. 5. Rather than simply providing the tutorial sequences and questions in a linear fashion, as is the case in "page-turner" type CAI products, agent engine 220 may determine, for example, to present review lessons after a series of questions has been answered incorrectly by presenting tutorial sequences to help build on the problematic concept. This is possible by storing the relationship of the data in the same table, for example. In one embodiment of the system, there may be "session_header" and "session_detail" tables, where the "session_detail" is a child of the "session_header." This relationship permits easy grouping of session information. Further, it permits the system to work with a smaller set of sessions that group together by limiting the amount of data displayed at any one time. However, in another embodiment, all "session_details" (or tutorial sequences and questions) may be grouped under the same single session header. Sessions are linked to the concepts they represent in a "session_concept" table, which permits the system to link concepts and sessions, allowing agent engine 220 to search for tutorial sequences and/or questions by concept. This relationship is illustrated in more detail with respect to FIG. 6.

The "session_concept" table allows agent engine 220 to search for sessions by the required concepts. The session and concept link allows for different required levels of skill required for a learner to work with the session. The "required_test_level" and "required_learn_level" store the values that define the required knowledge levels in order for a learner to advance.

In one embodiment, the "session_influence" and "session_event" allow the system to evaluate how the learner performs during a session. The "session_influence" variable stores values corresponding to a rating of the learner's mastery of a given concept based on the learner's past performance in a particular session. The influence impact on the rating is lessened when a learner is able to answer a particular question "somewhat right." However, when a learner's answer is considered off the mark and completely wrong, the influence impact on the mastery rating is more severe.

Viewing lessons contribute to influence values by allowing agent engine 220 to request feedback from the learner, such as by asking questions. For example, the learner may be prompted to provide feedback by answering questions such as "Do you understand the concepts?" or "Do you need more information?" "Session_events" are defined and stored in the "session_event" table as well as answer data so that the system can check the response to a question.

Figure 7:
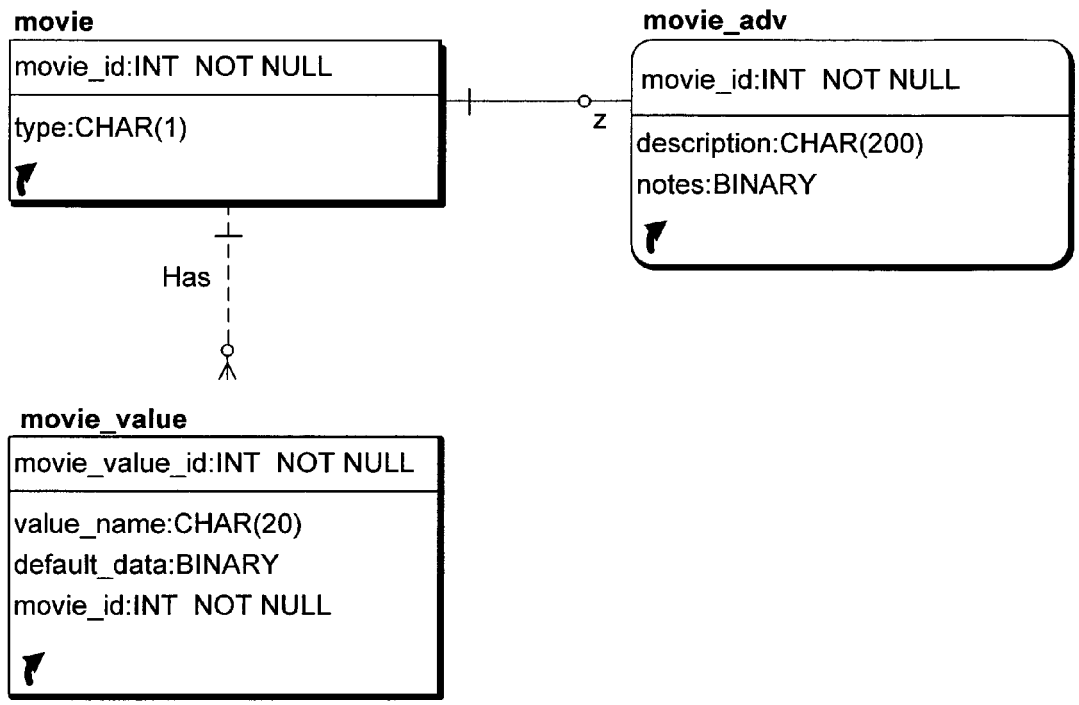
FIG. 7 is an exemplary Entity Relationship diagram of movie tables consistent with the present invention.
Figure 8:
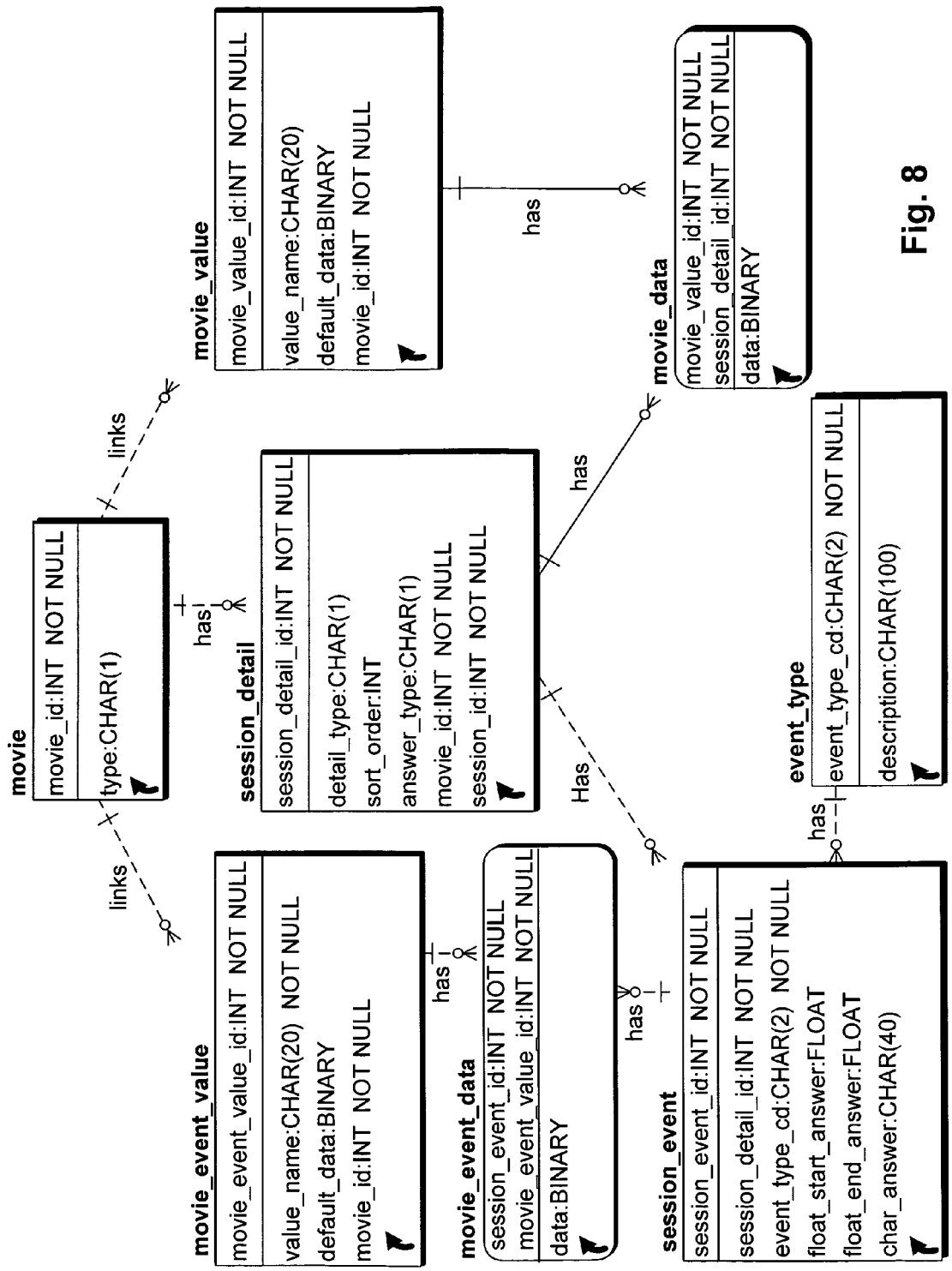
FIG. 8 is another exemplary Entity Relationship diagram showing complex movie tables consistent with the present invention.

Session player 200 acts similar to a movie projector playing "movies" which include tutorial materials, questions, and game-like situations for the learner. Agent engine 220 treats each interaction with the learner as a short movie with the agent engine 220 acting as an editor. Information about the movies are stored as movie tables, but unlike "page-turner"

type CAI software, the values and data can be changed, resulting in a change of "actors" and "scenes." For this reason, a movie can be used by more than one session, allowing for a flexible and expandable system. An ER diagram representing movie tables is shown in FIG. 7. More complex movies may be based on the movie tables illustrated by the ER diagram of FIG. 8. Additionally, intelligent CAI system 135, at the direction of agent engine 220, may re-edit movies to tailor the materials presented in a particular movie to the learner's demonstrated needs and abilities.

Alternatively, consistent with the principles of the present invention, intelligent CAI system 135 may store other data to substitute teacher created interactions instead of the stored movies. For example, concept matrix 230 may store Web addresses pointing to substitute material designed by a teacher or other third party for incorporation into intelligent CAI system 135. In such an embodiment, a teacher could incorporate into learner interactions links to a Web page including slides or materials such as hints, tutorials, or any other materials appropriate for delivery in a Web format.

Such a feature provides the teacher with the opportunity to define particular content for viewing by learners to enforce concepts or follow up tested concepts with additional instruction. Intelligent CAI system 135 may provide alternative content to a learner in place of, or as a supplement to, the movies stored in movie data 210 and played by session player 200. A teacher may also incorporate history reports and progress reports by linking to Web pages from concept matrix 230. Alternatively, concept matrix 230 may refer to a Web page to receive content updates. One of skill in the art would recognize that other media available for viewing on a Web site is contemplated and consistent with the spirit and scope of the present invention.

Figure 9:
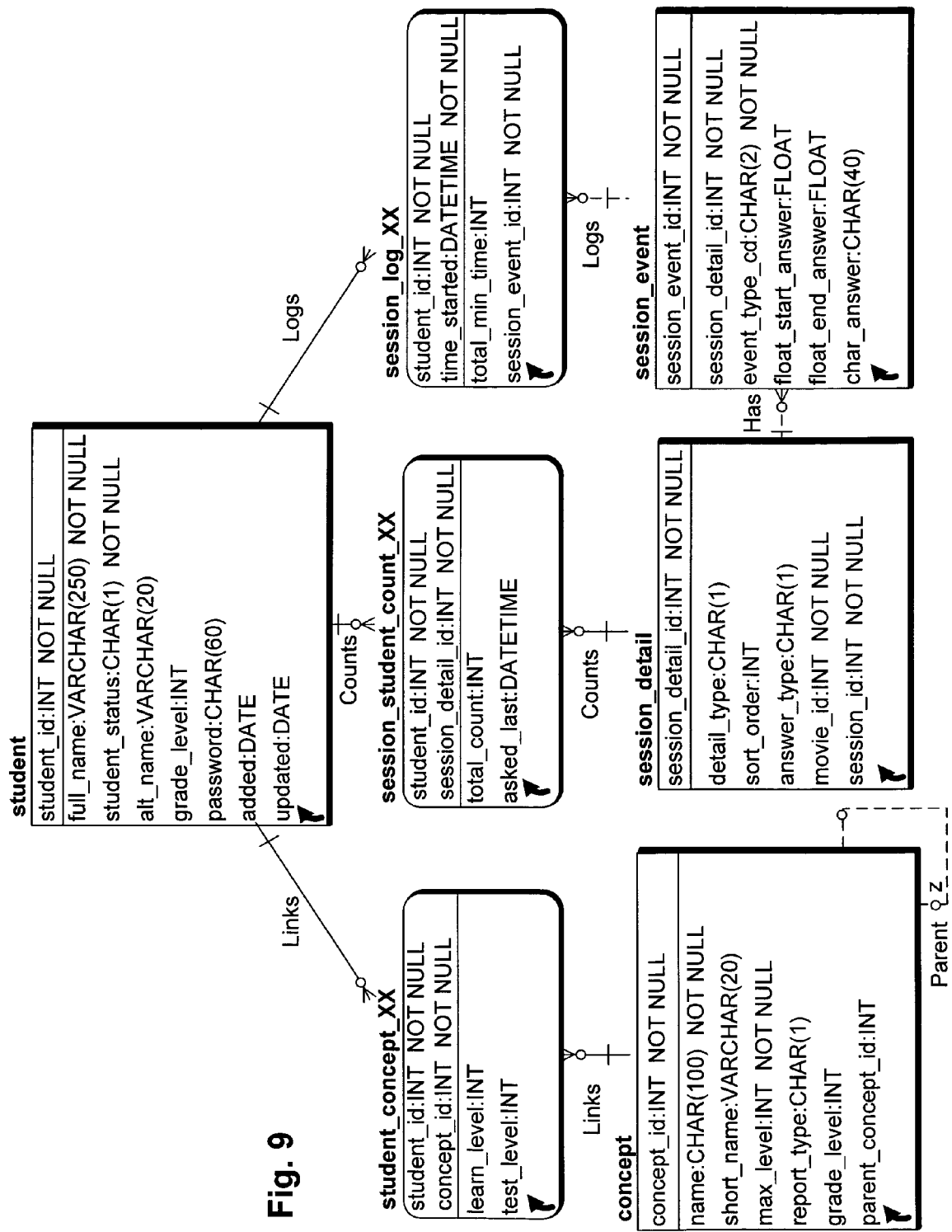
FIG. 9 is an exemplary entity relationship diagram of student tables consistent with the present invention.

The system may also use database tables to store historic information for a particular learner. These database tables may be associated with agent engine 220. Alternatively, the database tables may be stored in a separate component of intelligent CAI system 135, such as a learner database (not shown). FIG. 9 illustrates an exemplary ER diagram for student tables. Tables may be either associated with agent engine 220 or concept matrix 230, or may be stored separately.

Historic information for a particular learner may be used to prepare a report by report administrator 240. For example, information about concepts mastered, sessions presented, questions presented, and how the learner answered those questions may be presented in display or printed format via report administrator 240.

It should be understood that FIGS. 1 and 2 depict exemplary embodiments only. For example, intelligent CAI system 135 may be present on a server computer, with the learner accessing the program on a client computer via a network, such as a local area network (LAN) or the Internet. In another embodiment, components of CAI system 135 may be present in different computers. For example, session player 200 and movie data 210 may reside on a first computer, while agent engine 220 and concept matrix 230 are resident on a second computer networked to the first computer. Report administrator 240 may be resident on a third computer, also networked to the first and second computers. These embodiments may enhance security, as users need not have all the components at the same time, thereby reducing copying risks.

Further, in client-server and/or Internet-based versions, components may be distributed in such a way to provide maximum performance with a limited bandwidth. For example, movie data 210, including large audio and graphic files, may reside on a client computer while the remaining components reside elsewhere. This reduces the amount of data to be exchanged over the network. These alternate embodiments provide a means for providing the CAI product on hand-held devices, where storage considerations are essential. Additionally, in client-server and/or Internet-based versions, by way of using network connection 155, intelligent CAI system 135 may also allow multiple learners to collaborate together to solve a problem. For example, learners using client-server and/or Internet-based versions may collaborate by each working to solve particular aspects of the problem or by being each assigned distinct responsibilities in solving the problem.

The following provides an exemplary overview of a sequence executed by agent engine 220 for a learner session. Initially, a learner logs onto the system by providing a user name and password. Once the learner has logged in, agent engine 220 accesses the learner's data stored in concept matrix 230 and causes session player 200 to display an appropriate navigation screen. The navigation screen includes various icon options that the learner may select using input device 140. For example, the navigation screen may include a toolbar comprising various icons indicating menu options available for the learner.

From the navigation screen, the learner begins a session by selecting a particular game or lesson by, for example, making a selection using input device 140. Session player 200 next displays an appropriate explanatory introduction for the selection and agent engine 220 accesses the learner's history data for that particular game or lesson.

Agent engine 220 next reviews the learner's history to determine an appropriate slope value for concepts relevant to the selection. The slope value represents an analysis by agent engine 220 up to the present of how well the learner is doing with a given concept. Agent engine 220 may update an appropriate slope value, such as one or more of a "challenge_test_slope," a "review_test_slope," a challenge_learn_slope," or a "review_learn_slope" variables, based on a number of inputs. For example, agent engine 220 may update slope values on the basis of learner exposure to lessons and tutorials and learner responses to interrogations occurring during a learner session.

Test slope values for a given concept are updated with each learner response to problems in accordance with "session_influence" values for the current problem. Slope values are used by agent engine 220 to select the next problem in any given learner session. For example, at the start of a session, when the learner's historical data has been loaded into concept matrix 230, agent engine 220 reviews appropriate slope values for the concepts relevant to the selected game or lesson and compares these values to stored default values. After reviewing these values, agent engine 220 sets the initial mode for the learner session.

Agent engine 220 next reviews the learner's history to determine the appropriate slope for concepts relevant to selected game or lesson. If a strongly negative trend is detected in the learner's history, agent engine 220 invokes the "reviewing" mode. If a strongly positive trend is detected in the learner's history, agent engine 220 invokes the "challenging" mode. If neither is detected, agent engine 220 invokes the "reinforcing" mode. Based on this determination, agent engine 220 selects an appropriate problem to begin the session and sends the problem data to session player 220, which uses appropriate movie data 210 to display the problem on output device 150. Alternatively, agent engine 220 could access server 250 by way of network connection 155.

Upon viewing the problem, the learner may enter or select an answer for the problem, or the learner may click on an icon located on the toolbar to display additional options. Toolbar options may include a "Quit" command, which if selected, results in the game or lesson terminating, causing session player 200 to display the navigation screen and agent engine 220 to store in concept matrix 230 "Quit" as the response given to the problem and update concept influence and the slope value accordingly.

Another option on the toolbar may include a "Hint" command, which if selected, causes agent engine 220 to direct session player 200 to display a level 1 intervention for the concept at hand and agent engine 220 to store in concept matrix 230 "Hint" as the response given to the problem and update concept influence and the slope value accordingly. A level 1 intervention may include providing hints, formulae, or simple reminders to the learner.

A third option on the toolbar may include a "Help" command, which if selected, causes agent engine 220 to direct session player 200 to display a level 2 intervention for the concept at hand and agent engine 220 to store in concept matrix 230 "Help" as the response given to the problem and update concept influence and the slope value accordingly. A level 2 intervention may include more advanced information and may include, for example a tutorial sequence. As intervention levels increase, tutorials may become more detailed and include more elaborate instructions for solving the problem.

If the learner enters or selects an answer for the problem, agent engine 220 will execute one of several outcomes depending on the learner's answer.

For example, if the learner's answer is correct, agent engine 220 causes session player 200 to display the "correct" movie outcome stored in movie data 210 based on the problem's difficulty level, stores in concept matrix 230 "correct" as the response to the problem, and updates the slope for the concepts embodied in the problem in accordance with "session_influence" values stored for the problem.

If the solution to the particular problem is, for example, numerical and the learner's answer is too high, agent engine 220 causes session player 200 to display the "high" movie outcome, stores in concept matrix 230 "high" as the response to the problem, and updates the slope for the concepts embodied in the problem in accordance with "session_influence" values stored for the problem.

Alternatively, if the learner's answer is too low, agent engine 220 causes session player 200 to display the "low" movie outcome, stores in concept matrix 230 "low" as the response to the problem, and updates the slope for the concepts embodied in the problem in accordance with "session_influence" values stored for the problem.

After the completion of a problem, agent engine 220 reviews the newly updated slope for the concepts being tested before selecting a new problem. Agent engine 220 next determines which of the following sequences are appropriate for display to the learner.

If there has been no change in slope (as in the case of a "Hint" response to the previous problem), agent engine 220 selects an identical or nearly identical problem based on the concept pattern and corresponding "test_level" and "learn_level" for each concept embodied in the problem.

If there has been a positive change in slope (as in the case of a "correct" response), agent engine 220 selects a problem having a similar concept pattern that may have higher "test_level" and "learn_level" values.

If, after a number of problems, learner performance creates a positive trend in slope, agent engine 220 may trigger a change in mode from "reinforcing" mode to "challenging" mode. In the "challenging" mode, agent engine 220 will alter the concept pattern and select problems embodying concepts beyond the learner's demonstrated level of proficiency and beyond the learner's grade level. Agent engine 220 will also update the slope values for these advanced concepts accordingly.

If there has been a negative change in slope (as in the case of a "High" or "Low" response for a problem having a numerical answer), agent engine 220 will select a problem having a similar concept pattern that may have lower "test_level" and "learn_level" values.

If the slope is negative, agent engine 220 may isolate a particular learner misconception by selecting, in sequence, a series of problems having the same concept pattern but with different combinations of "test_level" and "learn_level" values. Accordingly, agent engine 220 may identify learner difficulty with mastery of underpinning concepts. To confirm its diagnosis, agent engine 220 may shift to a new concept pattern featuring the suspected underpinning concept.

If agent engine 220 detects a negative trend in slope, it may also trigger an intervention, causing session player 200 to display an intervention movie stored in movie data 210 or on server 250 rather than another problem. As previously discussed, at their lowest level, interventions may consist of hints, formulae, or simple reminders. At higher levels, intervention may include a tutorial sequence or detailed examples. After displaying the intervention, agent engine 220 may display a problem identical or nearly to the problem that triggered the intervention. However, if agent engine 220 detects a sufficiently negative trend in slope, meaning a slope exceeding a particular threshold, it may trigger a downward change in mode from "challenging" to "reinforcing," or from "reinforcing" to "reviewing."

Finally, when the learner elects to quit a session, agent engine 220 causes session player 200 to display the navigation screen. Updated slope values and other performance data are stored in concept matrix 230. From the navigation screen, the learner may exit the system entirely or log back in to begin a new session.

Consistent with the principles of the present invention, agent engine 220 may run on a computer or server external to the learner's computer. In such an arrangement agent engine 220 may examine all questions previously asked and data provided by all learners accessing the intelligent CAI system 135. For example, agent engine 220 could examine the data and locate questions and concept that students collectively often answered incorrectly. Additionally, agent engine 220 could identify concepts that learners need more practice with. Agent engine 220 might also examine patterns of problem solving by a learner in order to subsequently push students in the same direction to master the concept at a greater speed. By providing agent engine 220 on a server external to the learner, successful problem solving paths used by one learner may then be shared with other learners so that other learners could learn from successful problem solving approaches. In addition to agent engine 220, for example, other agents could interact with agent engine 220 to provide additional intelligence and/or modifications to the present system.

Additionally, one of skill in the art will recognize that although intelligent CAI system 135 has been described in relation to providing educational systems, other various implementations and uses are both contemplated and consistent with the principles of the present invention. For example, one could use intelligent CAI system 135 to design games and for other entertainment uses, such as putting together an interactive movie or television program by re-editing program content based upon a user's interactions with the system. In addition, intelligent CAI system 135 could apply to training pilots or drivers of vehicles or to teaching employees how to perform job-related activities, for example. Intelligent CAI system 135 could also implement a sales cycle management system for displaying information to a sales person regarding the next action the sales person should take to gain a sale or could perform marketing analysis to measure customer satisfaction of a product by accumulating data from customers. One of skill in the art will recognize that the principles of the present invention have a broad application to providing teaching applications in a variety of fields to teach a variety of subject matter.

Accordingly, other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for presenting a learner with a pedagogically appropriate interaction using a data processing apparatus, the method comprising:
   determining learner information, wherein learner information includes data identifying the learner and historic data of a past performance of the learner;
   selecting a lesson related to a subject matter based on an input by the learner;
   analyzing, by an agent engine adapted to execute program instructions, concept data of relationships between concepts and the historic data for underpinning concepts that support understanding of the subject matter of the selected lesson;
   computing a slope value, based on the analysis, reflecting which of the underpinning concepts have been mastered by the learner;
   determining a state for the interaction based on the slope value;
   creating a concept pattern based on the determined state; and
   accessing the appropriate interaction based on the concept pattern.

2. The method of claim 1, wherein the determined state is selected from one of a challenging, reinforcing, and reviewing state.

3. The method of claim 2, wherein the challenging state is invoked when the agent engine determines a positive trend of correctly answered questions based on the slope value and wherein the agent engine searches for a question based on concepts that are above a demonstrated level of ability of the learner.

4. The method of claim 2, wherein the reviewing state is invoked when the agent engine determines a negative trend of incorrectly answered questions based on the slope value and wherein the agent engine searches for a question that the learner previously viewed.

5. The method of claim 2, wherein the reinforcing state is invoked when the agent engine does not determine a positive or a negative trend and wherein the agent engine searches for a question at a level of ability demonstrated by the learner.

6. The method of claim 2, wherein the reviewing state is invoked when the agent engine determines a negative trend of incorrectly answered questions based on the slope value and wherein the agent engine searches for a question based on underpinning concepts that support understanding of the subject matter of the selected lesson and that are presumed to have been mastered by the learner.

7. The method of claim 1, wherein the concept pattern includes a list of concepts.

8. The method of claim 7, wherein the concept pattern further includes a level value associated with each concept in the list of concepts.

9. The method of claim 7, wherein the list of concepts further includes a link to concepts in a hierarchy of concepts.

10. The method of claim 1, wherein accessing the appropriate interaction further comprises accessing an external server to retrieve the appropriate interaction.

11. The method of claim 1, further comprising:
    presenting an appropriate question to the learner;
    evaluating an answer provided by the learner;
    updating the slope value based on the evaluation of the answer; and
    presenting a next question to the learner that is selected from a sequence of questions based on the updated slope value.

12. The method of claim 11, wherein evaluating the answer provided by the learner includes determining if the learner provided a correct answer, and wherein when the learner provided the correct answer, the agent engine causes a session player to display a correct movie outcome.

13. The method of claim 1, wherein the concept pattern includes a test level indicating a level at which the learner has successfully answered questions at an acceptable level of proficiency and a learn level indicating a level at which the learner has previously been presented lessons.

14. The method of claim 1, further comprising:
    determining whether the learner has mastered the underpinning concepts that support understanding of the subject matter of the selected lesson.

15. A system for presenting a learner with a pedagogically appropriate interaction, the system comprising:
    an output device for displaying the interaction to the learner;
    an input device to allow the learner to interact with the system; and
    a computer,
       wherein the computer includes a processor and a memory, the memory including an intelligent computer-aided instructional (CAI) system and
       wherein the intelligent CAI system further includes:
          a session player for presenting the interaction to the output device;
          a movie data component for storing media files to be used by the session player;
          an agent engine for determining the appropriate interaction to be played by the session player and for determining movie data in the movie data component to be accessed by the session player, the agent engine further comprising:
             program code for computing a slope value representing an analysis of concept data of relationships between concepts and historic data of the learner for underpinning concepts that support understanding of a subject matter of a lesson selected by the learner; and
             program code for determining a state for the interaction based on the slope value; and
          a concept matrix used by the agent engine to select the appropriate interaction based on the determined state.

16. The system of claim 15, wherein the intelligent CAI system further includes a report administrator for providing details about the interaction.

17. The system of claim 15, further comprising:
an external server connected to the system via an Internet connection for retrieving the appropriate interaction based on a network address specified by the concept matrix.

18. The system of claim 15, wherein the agent engine edits the media files to assemble a movie that is tailored to an ability level of the learner.

19. The system of claim 15, wherein the agent engine further comprises program code for determining whether the learner has mastered the underpinning concepts that support understanding of the subject matter of the selected lesson.

20. The system of claim 15, wherein the concept pattern includes a test level indicating a level at which the learner has successfully answered questions at an acceptable level of proficiency and a learn level indicating a level at which the learner has previously been presented lessons.

21. A method for presenting a learner with a pedagogically appropriate interaction, the method comprising:
determining learner information, wherein learner information includes data identifying the learner and historic data of a past performance of the learner;
analyzing, by an agent engine adapted to execute program instructions, concept data of relationships between concepts and the historic data for underpinning concepts that support understanding of the subject matter of the selected lesson; and
determining an interaction for the learner based on the analysis.

* * * * *